(12) United States Patent
Tsunoda et al.

(10) Patent No.: US 11,624,682 B2
(45) Date of Patent: Apr. 11, 2023

(54) SAMPLING SYSTEM AND SAMPLING METHOD

(71) Applicant: Mitsubishi Heavy Industries, Ltd., Tokyo (JP)

(72) Inventors: Jun Tsunoda, Yokohama (JP); Ryoichi Okura, Yokohama (JP); Kazuhiko Sato, Yokohama (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 17/376,794

(22) Filed: Jul. 15, 2021

(65) Prior Publication Data
US 2022/0057302 A1 Feb. 24, 2022

(30) Foreign Application Priority Data
Aug. 24, 2020 (JP) .............................. JP2020-140846

(51) Int. Cl.
*G01N 1/20* (2006.01)
(52) U.S. Cl.
CPC ..... *G01N 1/2035* (2013.01); *G01N 2001/205* (2013.01)
(58) Field of Classification Search
CPC .. G01N 1/2035; G01N 2001/205; G01N 1/02; G01N 2001/2064; G01N 2021/8557; F04F 10/00
USPC ...................................................... 73/863.51
See application file for complete search history.

(56) References Cited

U.S. PATENT DOCUMENTS

| 4,091,835 A | * | 5/1978 | Frampton ............ G05D 7/0173 137/499 |
| 5,090,256 A | | 2/1992 | Issenmann |
| 6,232,598 B1 | | 5/2001 | Dehnert et al. |
| 6,898,991 B2 | | 5/2005 | Geise et al. |

FOREIGN PATENT DOCUMENTS

| CN | 205719639 U | * | 11/2016 |
| EP | 0047533 A1 | * | 10/1981 |
| JP | 57-64651 U | | 4/1982 |

(Continued)

OTHER PUBLICATIONS

Hindi-language Office Action issued in Indian Application No. 202114031463 dated Apr. 11, 2022 with English translation (eight (8) pages).

(Continued)

*Primary Examiner* — John Fitzgerald
*Assistant Examiner* — Truong D Phan
(74) *Attorney, Agent, or Firm* — Crowell & Moring LLP

(57) ABSTRACT

To sample cooling water from a discharge pipe under vacuum, with a simple structure and without using a large-scale device. Provided is a sampling system for sampling cooling water flowing through a discharge pipe extending from a condenser to a sea. The sampling system includes: a bypass pipe branched off from the discharge pipe and joining the discharge pipe; two shutoff valves provided in the bypass pipe; a sampling pipe branched off from the bypass pipe between the two shutoff valves; a vent pipe branched off from the bypass pipe between the two shutoff valves; a sampling valve provided in the sampling pipe; and a vent valve provided in the vent pipe.

5 Claims, 3 Drawing Sheets

(56) References Cited

FOREIGN PATENT DOCUMENTS

| | | |
|---|---|---|
| JP | 7-60128 B2 | 6/1995 |
| JP | 2007-64856 A | 3/2007 |
| JP | 2018-151263 A | 9/2018 |
| SK | 285 033 B6 | 5/2006 |

OTHER PUBLICATIONS

Japanese-language Office Action issued in Japanese Application No. 2020-140846 dated Nov. 15, 2022 with English translation (6 pages).

* cited by examiner

SAMPLING SYSTEM AND SAMPLING METHOD

BACKGROUND OF THE INVENTION

1. Field of the Invention

The present invention relates to a sampling system and a sampling method for cooling water used in a condenser and discharged to a sea.

2. Description of the Related Art

In a power plant using sea water as cooling water, marine organisms deposited on the inside wall of a cooling water piping may serve as resistance, possibly lowering the cooling efficiency. Therefore, an inhibitor for restraining deposition and propagation of marine organisms on the inside wall of the cooling water piping is generally added to the cooling water (see JP-2018-151263-A).

PRIOR ART DOCUMENT

Patent Document

Patent Document 1: JP-2018-151263-A

Since the cooling water with the inhibitor added thereto is used in a heat exchanger such as a condenser and is thereafter discharged to the sea, it is necessary to accurately measure the residual concentration of the inhibitor in the cooling water by sampling and to confirm that the cooling water does not influence the environment, before discharge. The discharge pipe for guiding the cooling water used in the condenser to the sea is often embedded and extends underground, and may be piped at a higher position than the tide level (for example, sea level at high tide). In this case, the cooling water flowing is drawn by gravity, resulting in vacuum in the inside of the discharge pipe. To sample the cooling water from the discharge pipe under vacuum, a large-scale device such as a vacuum pump is generally needed.

It is an object of the present invention to provide a sampling system and a sampling method by which cooling water can be sampled from a discharge pipe under vacuum, with a simple configuration and without using a large-scale device.

SUMMARY OF THE INVENTION

In order to achieve the above object, according to the present invention, there is provided a sampling system for sampling cooling water flowing through a discharge pipe extending from a condenser to a sea, the sampling system including: a bypass pipe branched off from the discharge pipe and joining the discharge pipe; two shutoff valves provided in the bypass pipe; a sampling pipe branched off from the bypass pipe between the two shutoff valves; a vent pipe branched off from the bypass pipe between the two shutoff valves; a sampling valve provided in the sampling pipe; and a vent valve provided in the vent pipe.

According to the present invention, cooling water can be sampled from a discharge pipe under vacuum, with a simple configuration and without using a large-scale device.

DESCRIPTION OF THE PREFERRED EMBODIMENTS

Embodiments of the present invention will be described below using the drawings.

First Embodiment

Power Plant

Figure 1:
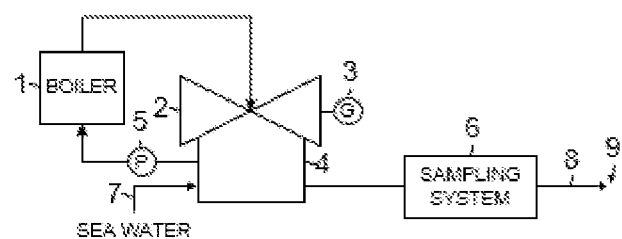
FIG. 1 is a schematic diagram of a power plant to which a sampling system according to a first embodiment of the present invention is applied.

FIG. 1 is a schematic diagram of a power plant to which a sampling system according to a first embodiment of the present invention is applied. The figure exemplifies a steam power plant (thermal power plant) in which a steam turbine is driven by steam generated in a boiler and a generator is driven by the steam turbine. It is to be noted that the sampling system according to the present invention is widely applicable to plants having a condenser, and is applicable also to a combined cycle power plant, a nuclear power plant, and the like.

The plant depicted in the figure includes a boiler 1, a steam turbine 2, a generator 3, a condenser 4, a feed-water pump 5, and a sampling system 6. In this plant, a high-temperature high-pressure steam generated by the boiler 1 is supplied to the steam turbine 2, and the steam turbine 2 is driven by the steam. The generator 3 is driven by the steam turbine 2, whereby electric power is obtained. An exhaust steam having driven the steam turbine 2 is supplied to the condenser 4, the supplied exhaust steam is cooled by cooling water (sea water) to be condensed in the condenser 4, and is then supplied to the boiler 1 by the feed-water pump 5, to be again a steam, which is supplied to the steam turbine 2.

Sea water pumped up from a sea by an intake pump (not illustrated) is supplied as cooling water to the condenser 4 through an intake pipe 7. An inhibitor (for example, oxidizing inhibitor such as chlorine) for restraining adhesion and propagation of marine organisms on inner wall surfaces of piping through which the cooling water flows is added to the cooling water flowing through the intake pipe 7. The cooling water having cooled the steam in the condenser 4 is discharged to the sea through a discharge pipe 8. The discharge pipe 8 extends from the condenser 4 to the sea, and its tip opening constitutes a discharge port 9 for discharging the cooling water. The length of the discharge pipe 8 varies according to the distance between the condenser 4 and the sea. The discharge port 9 of the discharge pipe 8 fronts on or in the sea. At least a part of the discharge pipe 8 is located at a higher position than the tide level and the discharge port 9, and the principle of a siphon is utilized for a conveying force for conveying the cooling water from the condenser 4 to the discharge port 9. Therefore, a part of the inside of the discharge pipe 8 is in a vacuum environment.

The aforementioned sampling system 6 is provided in the discharge pipe 8. The residual concentration of the inhibitor in the cooling water sampled by the sampling system 6 is measured by a testing person, and it is tested whether or not the residual concentration of the inhibitor in the cooling water to be discharged to the sea has been sufficiently lowered.

Sampling System

Figure 2:
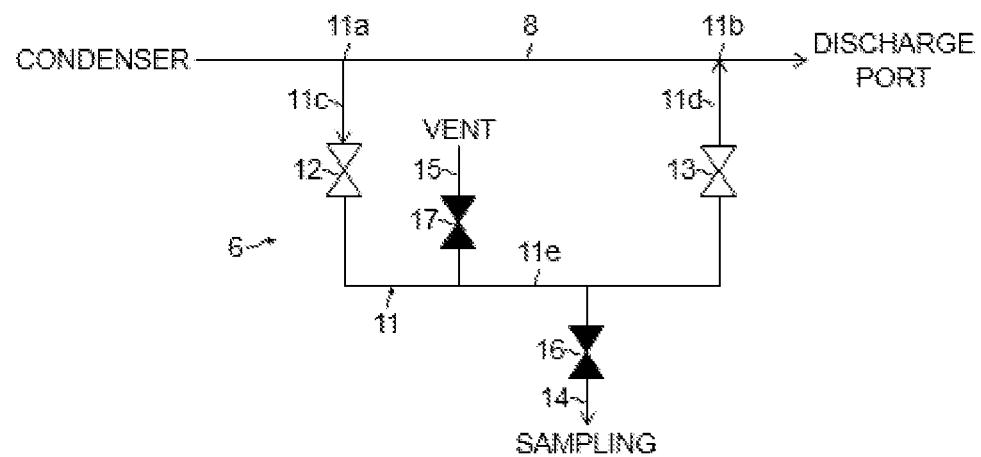
FIG. 2 is a schematic diagram of the sampling system according to the first embodiment of the present invention.
Figure 3:
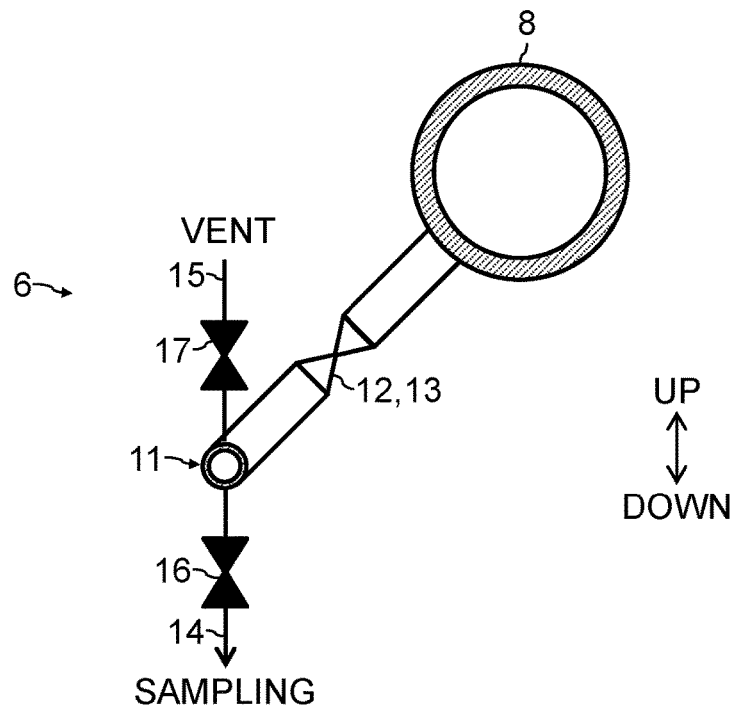
FIG. 3 is a schematic diagram depicting the positional relation of the sampling system and a discharge pipe according to the first embodiment of the present invention.

FIG. 2 is a schematic diagram of the sampling system according to the first embodiment of the present invention, and FIG. 3 is a schematic diagram depicting the positional relation of the sampling system and the discharge pipe. The sampling system 6 depicted in the figures is a system for sampling the cooling water flowing through the discharge pipe 8 and includes a bypass pipe 11, two shutoff valves 12 and 13, a sampling pipe 14, a vent pipe 15, a sampling valve 16, and a vent valve 17.

Bypass Pipe 11

The bypass pipe 11 is a piping which is branched off from the discharge pipe 8 and is again joined to the discharge pipe 8. The bypass pipe 11 is disposed at a higher position than the tide level (for example, sea level at high tide). The bypass pipe 11 is smaller than the discharge pipe 8 in inside diameter (channel sectional area).

An outlet 11b (joining part to the discharge pipe 8) of the bypass pipe 11 is located on the downstream side in regard to the flow direction of the discharge pipe 8 as compared to an inlet 11a (branching part from the discharge pipe 8) of the bypass pipe 11. The inlet 11a and the outlet 11b of the bypass pipe 11 are disposed at a water-filled part (the part where a dead air space is not generated) of the discharge pipe 8. A differential pressure corresponding to a pressure drop in the discharge pipe 8 is generated between the inlet 11a and the outlet 11b, and a pressure at the outlet 11b is lower by the differential pressure as compared to the inlet 11a. By utilizing the differential pressure, cooling water is drawn from the discharge pipe 8 into the bypass pipe 11, and is allowed to flow through the bypass pipe 11. Therefore, an interval for generating the differential pressure necessary for allowing the cooling water to flow from the discharge pipe 8 into the bypass pipe 11 should be secured between the inlet 11a and the outlet 11b. It is to be noted, however, that when the length of the bypass pipe 11 is longer than necessary, the pressure drop in the bypass pipe 11 itself is increased, and, therefore, the interval between the inlet 11a and the outlet 11b is set to be short within the range in which a required differential pressure can be secured.

In addition, as depicted in FIG. 3, the bypass pipe 11 is lowered downward (in the present embodiment, obliquely) from the inlet 11a, extends in parallel to the discharge pipe 8 for a predetermined distance, and then rises upward (in the present embodiment, obliquely) to the outlet 11b. In other words, the bypass pipe 11 is formed in a U shape by the lowering section 11c from the inlet 11a, the rising section 11d to the outlet 11b, and a horizontal section 11e connecting the lowering section 11c and the rising section 11d, and is disposed at a lower position as compared to the discharge pipe 8. The lowering section 11c and the rising section 11d are shaped such as to be monotonously lower in height as located closer to the horizontal section 11e, and, in the present embodiment, are in a straight pipe shape. The lowering section 11c and the rising section 11d may be vertical. The horizontal section 11e is a straight pipe shaped piping that connects the lower ends of the lowering section 11c with the rising section 11d.

Shutoff Valves 12 and 13

The shutoff valves 12 and 13 are provided in the bypass pipe 11. Of the shutoff valves 12 and 13, the one located relatively on the upstream side in regard to the flow direction of the cooling water in the bypass pipe 11 is the shutoff valve 12, and the one located relatively on the downstream side is the shutoff valve 13. The shutoff valves 12 and 13 are, for example, manual operation type valves which are opened and closed by manually operating handles. The shutoff valves 12 and 13 may be manual operation type valves which are opened and closed by actuators. In the present embodiment, the shutoff valve 12 is disposed in the lowering section 11c of the bypass pipe 11, whereas the shutoff valve 13 is disposed in the rising section 11d. It is to be noted, however, that the disposition of the shutoff valves 12 and 13 relative to the bypass pipe 11 can be modified within such a range in which the channel volume of the bypass pipe 11 between the shutoff valves 12 and 13 is equal to or more than the amount of the cooling water to be sampled. For example, one or both of the shutoff valves 12 and 13 may be disposed in the horizontal section 11e of the bypass pipe 11.

Sampling Pipe 14 Sampling Valve 16

The sampling pipe 14 is branched off from the bypass pipe 11 between the shutoff valves 12 and 13. In the present embodiment, the sampling pipe 14 is branched off from the horizontal section 11e of the bypass pipe 11, and extends downward in the vertical direction. The aforementioned sampling valve 16 is provided in the sampling pipe 14. Like the shutoff valves 12 and 13, the sampling valve 16 is a manual operation type valve which is opened and closed by manually operating a handle, and a manual operation type valve which is opened and closed by an actuator may also be adopted.

Vent Pipe 15 Vent Valve 17

Like the sampling pipe 14, the vent pipe 15 is branched off from the bypass pipe 11 between the shutoff valves 12 and 13. In the present embodiment, the vent pipe 15 is branched off from the horizontal section 11e of the bypass pipe 11, and extends upward in the vertical direction. While a configuration in which the vent pipe 15 is branched off from the bypass pipe 11 at a position on the upstream side of the sampling pipe 14 is exemplified in FIG. 2, the positional relation of the sampling pipe 14 and the vent pipe 15 may be reversed. The aforementioned vent valve 17 is provided in the vent pipe 15. Like the shutoff valves 12 and 13, the vent valve 17 is a manual operation type valve which is opened and closed by manually operating a handle, and a manual operation type valve which is opened and closed by an actuator may also be adopted.

Sampling Method

A method of sampling the cooling water flowing through the discharge pipe 8 by use of the sampling system 6 described referring to FIGS. 2 and 3 will be described. In FIG. 2, the valves represented by solid white symbols are in an open state, while the valves represented by solid black symbols are in a closed state. When the cooling water is not sampled, as depicted in FIG. 2, the shutoff valves 12 and 13 are opened (fully opened) and the sampling valve 16 and the vent valve 17 are closed (fully closed), and the cooling water is let to flow through the bypass pipe 11. As aforementioned, a part of the colling water is drawn into the bypass pipe 11 by the differential pressure between the inlet 11a and the outlet 11b, and a flow of the cooling water is formed in the bypass pipe 11.

Thereafter, when the cooling water is sampled, the two shutoff valves 12 and 13 are closed (fully closed) and the sampling valve 16 and the vent valve 17 are opened. First, since the shutoff valves 12 and 13 closed, the channel between the shutoff valves 12 and 13 of the bypass pipe 11 is isolated from the discharge pipe 8, and the cooling water is sealed between the shutoff valves 12 and 13 of the bypass pipe 11. Then, a sampling bottle (not illustrated) for the cooling water is disposed on a lower side of an opening end of the sampling pipe 14, and the sampling valve 16 is opened. As a result, the cooling water sealed in the bypass pipe 11 between the shutoff valves 12 and 13 is discharged from the sampling pipe 14, and the cooling water is recovered (sampling) in the sampling bottle. In this instance, since the vent valve 17 opened, air flows into the bypass pipe 11 between the shutoff valves 12 and 13 through the vent pipe 15, and the discharge of the cooling water from the sampling pipe 14 is smoothened.

When the sampling of the cooling water is finished, the sampling valve 16 and the vent valve 17 are closed and the shutoff valves 12 and 13 are opened, whereby the cooling water is again introduced into the bypass pipe 11. For example, first, the sampling valve 16 and the vent valve 17 are closed. At this time point, air is accumulated in the bypass pipe 11 between the shutoff valves 12 and 13. However, since the bypass pipe 11 is disposed lower than the discharge pipe 8, opening of the shutoff valves 12 and 13 results in that the air accumulated in the bypass pipe 11 between the shutoff valves 12 and 13 is discharged into the discharge pipe 8, due to specific gravity difference between the air and the cooling water. As a result, the cooling water flows from the discharge pipe 8 into the bypass pipe 11, and a flow of the cooling water is again formed in the bypass pipe 11.

Thereafter, when the occasion of the next-time sampling of the cooling water comes, the above procedure is again performed to sample the cooling water.

Effects (1) As aforementioned, according to the present embodiment, only connecting the bypass pipe 11 to the discharge pipe 8 and attaching the sampling pipe 14, the vent pipe 15 and some valves, cooling water can be sampled from the discharge pipe 8 under vacuum, without using a large-scale device such as a vacuum pump. In addition, since the sampling system 6 is simple in configuration, it is easily applicable to an existing plant.

Note that it is one merit of the present embodiment that the inlet 11a and the outlet 11b of the bypass pipe 11 are thus located at a higher position than the tide level and that cooling water can be sampled even from a channel under vacuum of the discharge pipe 8. In addition, even when a positive pressure is present in the inside of the discharge pipe 8, the configuration of the sampling system 6 can be applied as it is. In this case, also, the cooling water flowing through the discharge pipe 8 can naturally be sampled by the sampling system 6.

(2) Since the bypass pipe 11 is disposed at a lower position than the discharge pipe 8, after the sampling of the cooling water, air accumulated in the bypass pipe 11 can be smoothly discharged into the discharge pipe 8 by specific gravity difference between the air and the cooling water. As a result, cooling water is introduced into the bypass pipe 11 after sampling, and a flow of the cooling water in the inside of the bypass pipe 11 can be easily reconstructed, without being hindered by the residual air. Therefore, by similar procedure, sampling of the cooling water can be easily performed repeatedly any number of times.

Second Embodiment

Figure 4:
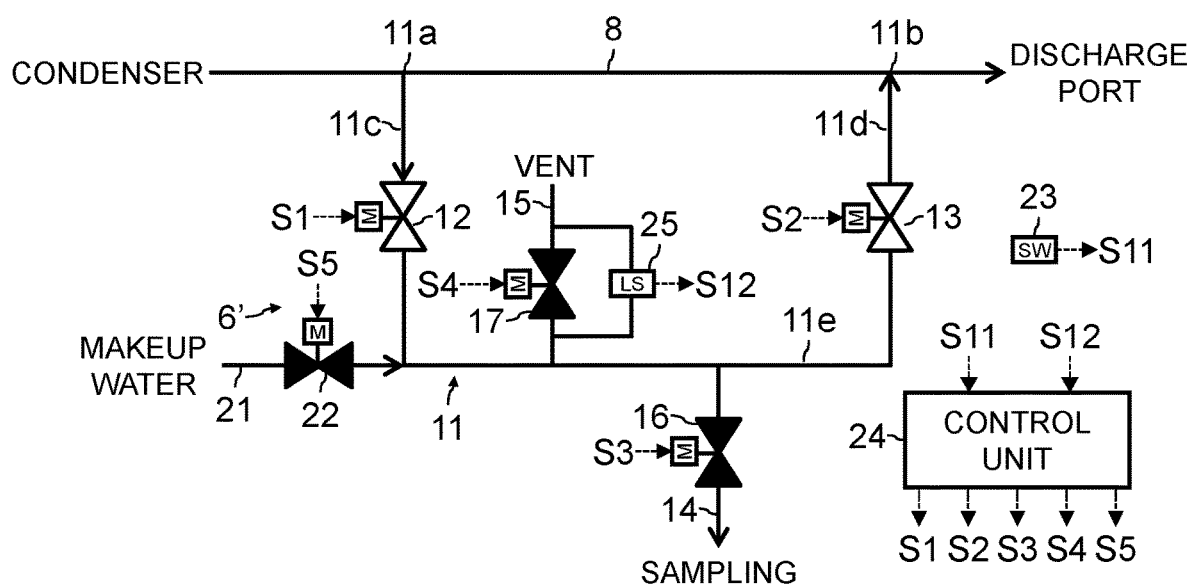
FIG. 4 is a schematic diagram of a sampling system according to a second embodiment of the present invention.

FIG. 4 is a schematic diagram of a sampling system according to a second embodiment of the present invention. The present embodiment differs from the first embodiment in that while cooling water is sampled by manually operating each valve in the first embodiment, a sampling work is semi-automated by controlling the operation of each valve by a control unit in the present embodiment.

Configuration

A sampling system 6' in the present embodiment is configured by adding a makeup water pipe 21, a makeup water valve 22, an operating device 23, and a control unit 24 to the sampling system 6 according to the first embodiment. The makeup water pipe 21 is a piping connected to the bypass pipe 11, and the makeup water valve 22 is provided in the makeup water pipe 21. A base end (an end portion on the side opposite to a connection section for connection with the bypass pipe 11) of the makeup water pipe 21 is, for example, connected to a pump. The pump connected with the base end of the makeup water pipe 21 may be an exclusive pump, and the feed-water pump 5 depicted in FIG. 1 and an intake pump for pumping up sea water as cooling water may also be used. Instead of connecting the base end of the makeup water pipe 21 to the pump, the base end of the makeup water pipe 21 may be connected to a water storage tank (not illustrated) disposed at a higher position than the discharge pipe 8. Such a configuration results in that the upstream side (the side opposite to the bypass pipe 11) of the makeup water valve 22 is higher in pressure than the downstream side (the bypass pipe 11 side).

The operating device 23 is, for example, an operation switch that outputs an instruction signal S11 for an instruction on sampling of the cooling water. The control unit 24 is a unit for sequence control of the shutoff valves 12 and 13, the sampling valve 16, the vent valve 17 and the makeup water valve 22, with the instruction signal S11 from the operating device 23 as a trigger. While a computer may be adopted as the control unit 24, an electric circuit, for example, can be used as the control unit 24. While a remote controller may be used as the control unit 23, the control unit may be installed, for example, on a control panel together with the control unit 24.

Note that in the present embodiment, the shutoff valves 12 and 13 are normal open type power-driven on-off valves, whereas the sampling valve 16, the vent valve 17 and the makeup water valve 22 are normal close type power-driven on-off valves. For example, electromagnetically driven on-off valves can be adopted as these valves, and the normal open type is a valve which is closed in a state in which a solenoid is demagnetized, whereas the normal close type are valves which are opened in a state where solenoids are demagnetized. The shutoff valves 12 and 13, the sampling valve 16, the vent valve 17 and the makeup water valve 22 are driven respectively by command signals S1 to S5 from the control unit 24. In addition, the vent pipe 15 is provided with a water level indicator 25 (for example, a level switch), and a detection signal S12 from the water level indicator 25 is inputted to the control unit 24.

The other configurations of the sampling system 6' of the present embodiment are similar to those of the sampling system 6 of the first embodiment.

Valve Control

Figure 5:
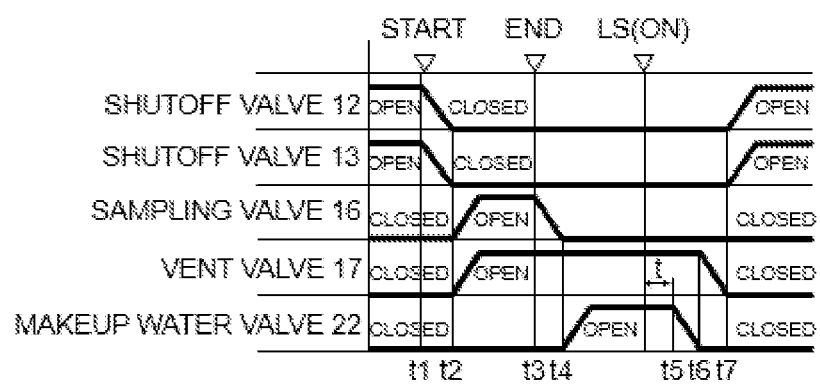
FIG. 5 is a timing chart depicting the procedure of a valve control according to the second embodiment of the present invention.

FIG. 5 is a timing chart depicting the procedure of valve control by the control unit. The control unit 24, when the instruction signal S11 inputted thereto from the operating device 23, outputs the command signals S1 to S5 to the shutoff valves 12 and 13, the sampling valve 16, the vent valve 17 and the makeup water valve 22 at appropriate timings, with the instruction signal S11 as a trigger, thereby to sequentially command operations of the following steps S101 to S107.

Step S101

Step S101 is a closing operation for the shutoff valves 12 and 13. In the case of sampling cooling water by use of the sampling system 6' of the present embodiment, first, a sampling bottle is set on a lower side of an open end of the sampling pipe 14, a power source of the control unit 24 is turned on to operate the operating device 23, and an instruction on sampling is issued to the control unit 24. When the instruction signal S11 is inputted from the operating device 23, the control unit 24 outputs command signals S1 and S2 to the shutoff valves 12 and 13, thereby to command closure of the shutoff valves 12 and 13 (time t1). This command causes transfer to a state in which the shutoff valves 12 and 13, the sampling valve 16, the vent valve 17 and the makeup water valve 22 are all closed, and cooling water is sealed between the shutoff valves 12 and 13.

Step S102

Step S102 is an opening operation of the sampling valve 16 and the vent valve 17. A set time is required from the output of a command to the shutoff valves 12 and 13 to completion of the fully closing operation of the shutoff valves 12 and 13. When the set time is elapsed from time t1 (time t2), the control unit 24 outputs command signals S3 and S4 to the sampling valve 16 and the vent valve 17, thereby to command opening of the sampling valve 16 and the vent valve 17. This command causes transfer to a state in which the shutoff valves 12 and 13 and the makeup water valve 22 are closed, the sampling valve 16 and the vent valve 17 are open, and the cooling water isolated between the shutoff valves 12 and 13 is discharged from the sampling pipe 14 to be recovered into the sampling bottle.

Note that while a case in which opening of the sampling valve 16 and the vent valve 17 is commanded after the set time from the output of a command to the shutoff valves 12 and 13 has been described, other mode may be adopted for determination of the timing for commanding the opening of the sampling valve 16 and the vent valve 17. For example, a configuration may be adopted in which a limit switch for detecting full closure of the shutoff valves 12 and 13 is provided, and an opening is commanded from the control unit 24 to the sampling valve 16 and the vent valve 17 when a full closure signal is inputted from the limit switch.

Step S103

Step S103 is a closing operation of the sampling valve 16. A set time is required from the opening of the sampling valve 16 and the vent valve 17 to completion of recovery of the cooling water. When this set time is elapsed from time t2 (time t3), the control unit 24 stops outputting the command signal S3 to the sampling valve 16, thereby to command closure of the sampling valve 16. This command causes transfer to a state in which the shutoff valves 12 and 13, the sampling valve 16 and the makeup water valve 22 are closed, only the vent valve 17 is open, and in which bleeding from the bypass pipe 11 between the shutoff valves 12 and 13 can be started.

While a case in which closure of the sampling valve 16 is automatically commanded after the set time from the output of the command to the sampling valve 16 and the vent valve 17 has been described, other mode may be adopted for determination of the timing for commanding closure of the sampling valve 16. For example, an operating device for issuing an instruction on end of sampling is added, and when the operating device is operated by a judgment of a person who performs sampling, a command for closure may be given from the control unit 24 to the sampling valve 16 according to a signal from the additional operating device. The additional operating device can be configured similarly to the operating device 23.

Step S104

Step S104 is an opening operation of the makeup water valve 22. A set time is required from the stop of outputting of a command to the sampling valve 16 to completion of a full closing operation of the sampling valve 16. When this set time is elapsed from time t3 (time t4), the control unit 24 outputs a command signal S5 to the makeup water valve 22, thereby to command opening of the makeup water valve 22. This command causes a transfer to a state in which the shutoff valves 12 and 13 and the sampling valve 16 are closed and the vent valve 17 and the makeup water valve 22 are open. As a result, water is fed into a pipeline between the shutoff valves 12 and 13 and the sampling valve 16, residual air in the pipeline is discharged from the vent pipe 15, and the water level in the vent pipe 15 is gradually raised.

Note that while a case in which opening of the makeup water valve 22 is commanded after the set time from the stop of outputting of a command to the sampling valve 16 has been described, other mode may be adopted for determination of the timing for commanding the opening of the makeup water valve 22. For example, a configuration may be adopted in which a limit switch for detecting full closure of the sampling valve 16 is provided, and a command for opening is given from the control unit 24 to the makeup water valve 22 when a full closure signal is inputted from the limit switch.

Step S105

Step S105 is a closing operation of the makeup water valve 22. When the water level in the vent pipe 15 is raised and the water level indicator 25 is turned ON, the control unit 24 stops outputting the command signal S5 to the makeup water valve 22 at a timing delayed by time t from the time when the water level indicator 25 is turned ON, and commands closure of the makeup water valve 22 (time t5). This command causes transfer to a state in which the shutoff valves 12 and 13, the sampling valve 16 and the makeup water valve 22 are closed and only the vent valve 17 is open. With the delay time t secured, the water level in the vent pipe 15 can be raised to a higher position than the vent valve 17, even in consideration of an error.

Step S106

Step S106 is closure of the vent valve 17. A set time is required from outputting of a command to the makeup water valve 22 is stopped to completion of full closing operation of the makeup water valve 22. When the set time is elapsed from time t5 (time t6), the control unit 24 stops outputting the command signal S4 to the vent valve 17, and commands closure of the vent valve 17. This command causes transfer to a state in which shutoff valves 12 and 13, the sampling valve 16, the vent valve 17 and the makeup water valve 22 are all closed.

Step S107

Step S107 is an opening operation of the shutoff valves 12 and 13. A set time is required from the stop of outputting of a command to the vent valve 17 to completion of a full closing operation of the vent valve 17. When this set time is elapsed (time t7), the control unit 24 stops outputting the command signals to the shutoff valves 12 and 13, and commands opening of the shutoff valves 12 and 13. This command causes transfer to a state in which the shutoff valves 12 and 13 are open, the sampling valve 16, the vent valve 17 and the makeup water valve 22 are closed, the state is returned to the state before the start of sampling, and valve control is completed.

Note that while a case in which opening of the shutoff valves 12 and 13 is commanded after the set time from the stopping of outputting of a command to the vent valve 17 has been described, other mode may be adopted for determination of the timing for commanding opening of the shutoff valves 12 and 13. For example, a configuration may be adopted in which a limit switch for detecting full closure of the vent valve 17 is provided, and a command for opening is given from the control unit 24 to the shutoff valves 12 and 13 when the full closure signal is inputted from the limit switch.

Effects

In the present embodiment, also, cooling water can be sampled from the discharge pipe 8 under vacuum, without using a large-scale device such as a vacuum pump. The sampling system 6' can be easily applied to an existing plant.

In addition, in the present embodiment, the sampling operation of cooling water can be semi-automated by use of the control unit 24, and the sequence of operations of the valves is not mistaken, thus the sampling operation can be performed efficiently.

Besides, since the bypass pipe 11 is located at a lower position than the discharge pipe 8, if the shutoff valves 12 and 13 are opened after the sampling valve 16 and the vent valve 17 are closed similarly to the first embodiment, after the sampling of the cooling water, air in the bypass pipe 11 can be discharged into the discharge pipe 8 by the specific gravity difference between the air and the cooling water. However, in the present embodiment, instead of such bleeding by utilizing the specific gravity difference between air and the cooling water, the makeup water is supplied from the makeup water pipe 21 to the bypass pipe 11 after sampling of the cooling water. By thus positively performing bleeding of the bypass pipe 11, a flow of the cooling water can be again formed in the bypass pipe 11 after sampling of the cooling water.

Note that in the present embodiment, since the makeup water is positively fed into the bypass pipe 11 to effect bleeding, the bypass pipe 11 may not necessarily be disposed at a lower position than the discharge pipe 8, and the bypass pipe 11 can be disposed at a higher position than the discharge pipe 8.

In addition, since the water level indicator 25 that inputs a detection signal S12 to the control unit 24 as a trigger for outputting a closure command to the vent valve 17 after sampling of the cooling water is provided, the vent valve 17 is closed after the water level is actually raised to the vent valve 17. This also contributes to restraining of stagnation of air in the bypass pipe 11. It is to be noted that since the flow rate of makeup water from the makeup water pipe 21 is substantially constant and the time required for the water level in the vent pipe 15 to reach the vent valve 17 is substantially known, a control of closing the vent valve 17 by time counting while taking this time in consideration is also considered.

Besides, while an example in which valve control by the control unit 24 is performed with the sampling system 6' having the makeup water pipe 21 and the makeup water valve 22 as an object has been described in the present embodiment, a configuration may also be adopted in which the valves in the first embodiment are made to be of power-driven type and opening and closing of the valves are controlled by the control unit 24.

In addition, while an example in which the sampling system 6' subjected to valve control by the control unit 24 is provided with the makeup water pipe 21 and the makeup water valve 22 has been described, the makeup water pipe 21 and the makeup water valve 22 may be applied to the sampling system 6 in the first embodiment. In this case, the makeup water valve 22 can be manual operation type on-off valve similarly to the shutoff valves 12 and 13.

While an example in which normal open type or normal close type valves are adopted as the shutoff valves 12 and 13 and the sampling valve 16 and the like has been described in the present embodiment, valves of the type in which both an opening operation and a closing operation are carried out by actuators may be used as the shutoff valves 12 and 13 and the sampling valve 16 and the like.

Third Embodiment

Figure 6:
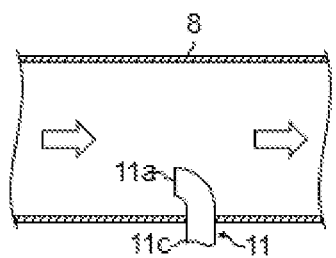
FIG. 6 is a schematic diagram depicting the configuration of an inlet of a bypass pipe of a sampling system according to a third embodiment of the present invention and the vicinity thereof.

FIG. 6 is a schematic diagram depicting the configuration of an inlet of a bypass pipe in a sampling system according to a third embodiment of the present invention and the vicinity thereof. The present embodiment differs from the first embodiment in that the inlet 11a of the bypass pipe 11 projects into the inside of the discharge pipe 8 and is opening toward the upstream side of the discharge pipe 8. In the present embodiment, an upper end of the lowering section 11c of the bypass pipe 11 is bent in an L shape, and the inlet 11a faces the flow of the cooling water flowing through the discharge pipe 8.

The other configurations are similar to those of the first embodiment or the second embodiment.

According to the present embodiment, in addition to effects similar to those of the first embodiment or the second embodiment, due to the structure in which the inlet 11a of the bypass pipe 11 faces the flow of the cooling water flowing through the discharge pipe 8, the cooling water can be efficiently introduced into the bypass pipe 11 by utilizing a dynamic pressure of the cooling water.

DESCRIPTION OF REFERENCE CHARACTERS

4: Condenser
6, 6': Sampling system
8: Discharge pipe
11: Bypass pipe
11a: Inlet (Branching part)
11b: Outlet (Joining part)
12, 13: Shutoff valve
14: Sampling pipe
15: Vent pipe
16: Sampling valve
17: Vent valve
21: Makeup water pipe
22: Makeup water valve
23: Operating device
24: Control unit
S11: Instruction signal

What is claimed is:

1. A sampling system for sampling cooling water flowing through a discharge pipe extending from a condenser to a sea, the sampling system comprising:
 a bypass pipe branched off from the discharge pipe and joining the discharge pipe;
 two shutoff valves provided in the bypass pipe;
 a sampling pipe branched off from the bypass pipe between the two shutoff valves;

a vent pipe branched off from the bypass pipe between the two shutoff valves;
a sampling valve provided in the sampling pipe;
a vent valve provided in the vent pipe;
a makeup water pipe connected to the bypass pipe;
a makeup water valve provided in the makeup water pipe;
an operating device that outputs an instruction signal for an instruction on sampling of the cooling water; and
a control unit that controls the two shutoff valves, the vent valve, the sampling valve, and the makeup water valve with the instruction signal from the operating device as a trigger, wherein
the two shutoff valves are normal open type power-driven on-off valves, whereas the vent valve, the sampling valve, and the makeup water valve are normal close type power-driven on-off valves, and
the control unit, when the instruction signal is inputted from the operating device, sequentially commands closure of the two shutoff valves,
opening of the sampling valve and the vent valve,
closure of the sampling valve,
opening of the makeup water valve,
closure of the makeup water valve,
closure of the vent valve, and
opening of the two shutoff valves.

2. The sampling system according to claim 1, wherein the bypass pipe is disposed at a higher position than a tide level.

3. The sampling system according to claim 1, wherein the sampling system is disposed at a lower position relative to the discharge pipe.

4. The sampling system according to claim 1, wherein
an inlet of the bypass pipe projects into an inside of the discharge pipe and an opening of the inlet is toward an upstream side of the discharge pipe.

5. A sampling method for sampling cooling water flowing through a discharge pipe extending from a condenser to a sea by use of a sampling system, the method comprising:
providing the sampling system, wherein the sampling system comprises: a bypass pipe branched off from the discharge pipe and joining the discharge pipe; two shutoff valves provided in the bypass pipe; a sampling pipe branched off from the bypass pipe between the two shutoff valves; a vent pipe branched off from the bypass pipe between the two shutoff valves; a sampling valve provided in the sampling pipe; and a vent valve provided in the vent pipe; opening the two shutoff valves, closing the sampling valve and the vent valve, and allowing the cooling water to flow into the bypass pipe, closing the two shutoff valves, opening the sampling valve and the vent valve, and sampling the cooling water sealed between the two shutoff valves from the sampling pipe, and, thereafter, closing the sampling valve and the vent valve, opening the two shutoff valves, and introducing the cooling water into the bypass pipe again.

* * * * *